United States Patent
Kim et al.

(10) Patent No.: US 7,294,957 B2
(45) Date of Patent: Nov. 13, 2007

(54) FLAT LAMP

(75) Inventors: Gi-young Kim, Yongin-si (KR);
Seong-eui Lee, Seongnam-si (KR);
Hyoung-bin Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 262 days.

(21) Appl. No.: 11/099,502

(22) Filed: Apr. 6, 2005

(65) Prior Publication Data

US 2006/0061275 A1 Mar. 23, 2006

(30) Foreign Application Priority Data

Sep. 22, 2004 (KR) .................. 10-2004-0075969

(51) Int. Cl.
*H01J 1/62* (2006.01)
(52) U.S. Cl. .................. 313/491; 313/631
(58) Field of Classification Search .......... 313/491, 313/492, 595, 596, 631
See application file for complete search history.

(56) References Cited

U.S. PATENT DOCUMENTS 5,329,203 A * 7/1994 Jeong .................. 313/491
2005/0280347 A1* 12/2005 Jang et al. ............ 313/492

* cited by examiner

*Primary Examiner*—Vip Patel
(74) *Attorney, Agent, or Firm*—Buchanan Ingersoll & Rooney PC (57) ABSTRACT

Provided is a flat lamp which includes a lower substrate and an upper substrate that form discharge space therebetween disposed facing each other, a plurality of discharge electrodes formed at least on one of the lower substrate and the upper substrate, a plurality of spacers that form a plurality of discharge cells by defining the discharge space, and disposed parallel to the discharge electrodes between the lower substrate and the upper substrate, a plurality of auxiliary electrodes, to which a voltage is induced by applying a voltage to the discharge electrodes, formed on a surface of the spacers, and a fluorescent layer formed on an inner wall of the discharge cells.

27 Claims, 9 Drawing Sheets

FLAT LAMP

BACKGROUND OF THE INVENTION

Priority is claimed to Korean Patent Application No. 10-2004-0075969, filed on Sep. 22, 2004, in the Korean Intellectual Property Office, the disclosure of which is incorporated herein in its entirety by reference.

1. Field of the Invention

The present invention relates to a flat lamp, and more particularly, to a flat lamp that can reduce a discharge voltage and improve luminous efficiency.

2. Description of the Related Art

Flat lamps have developed as back-lights of liquid crystal displays (LCD). They include a surface discharge type or a facing discharge type flat lamp type, in which a whole lower portion of the light emitting surface is discharge space, in consideration of luminous efficiency and uniformity of brightness. These are regarded as improvements to a conventional edge-light type or a direct-light type flat lamp which uses a cold cathode fluorescent lamp. The surface discharge flat lamp has an advantage of a stable discharge characteristic compared to a facing discharge flat lamp, but brightness is inferior to the facing discharge flat lamp.

Figure 1:
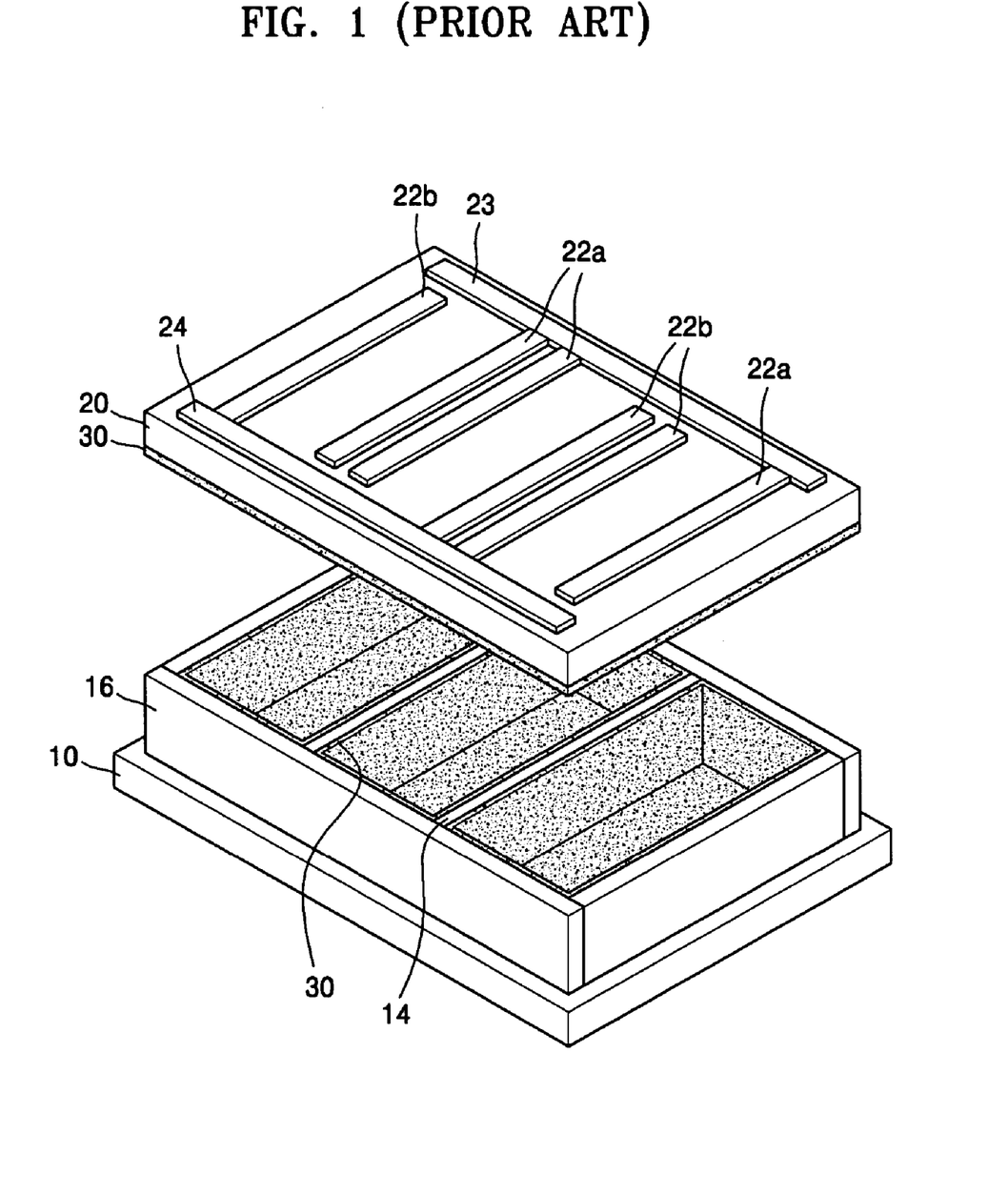
FIG. 1 is an exploded perspective view of a conventional flat lamp.
Figure 2:
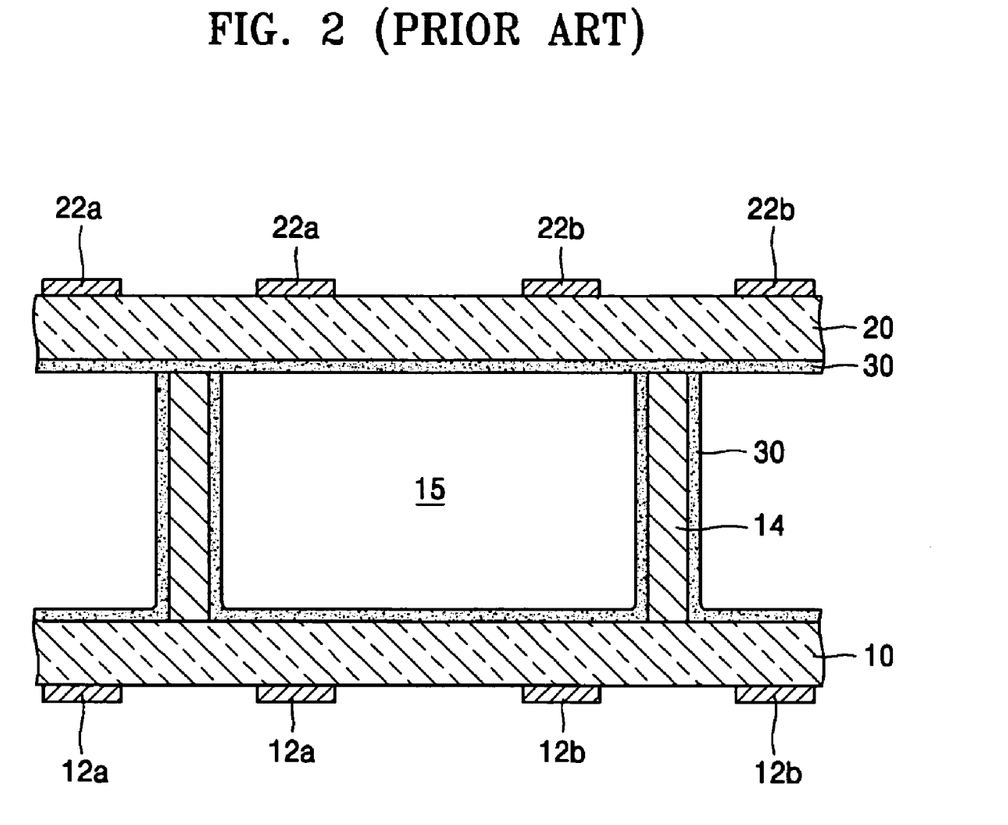
FIG. 2 is a partial cross-sectional view of the flat lamp of FIG. 1.

FIG. 1 is an exploded perspective view of a conventional surface discharge flat lamp. FIG. 2 is a partial cross-sectional view of the flat lamp of FIG. 1.

Referring to FIGS. 1 and 2, a lower substrate 10 and an upper substrate 20 are disposed facing each other with a predetermined distance by frames 16. A closed discharge space is formed by the frames 16 between the lower substrate 10 and the upper substrate 20. Conventionally, this space is filled with a discharge gas mixed with neon (Ne) gas and xenon (Xe) gas. A plurality of spacers 14 that defines a plurality of discharge cells 15 by defining the discharge spaces is disposed between the lower substrate 10 and the upper substrate 20. The spacers 14 support the lower substrate 10 and the upper substrate 20 and, at the same time, prevent crosstalk between the adjacent discharge cells 15.

A fluorescent layer 30 that generates visible light by being excited by ultraviolet rays generated by a discharge is formed on an inner side of the lower substrate 10 and the upper substrate 20 and both sides of the spacers 14. And, a plurality of discharge electrodes for generating a plasma discharge are formed on the lower substrate 10 and the upper substrate 20. More specifically, each of first and second lower electrodes 12a and 12b and first and second upper electrodes 22a and 22b are formed in pairs on an outside of the lower substrate 10 and the upper substrate 20, respectively. Here, the first electrodes 22a are connected to a first upper common line 23, and the second upper electrodes 22b are connected to a second upper common line 24. Also, the first lower electrodes 12a are connected to a first lower common line (not shown), and the second lower electrodes 12b are connected to a second lower common line (not shown). In the above configuration, no discharge occurs between the first lower electrode 12a and the first upper electrode 22a since the same potential is applied to the first lower electrode 12a and the first upper electrode 22a. Also, no discharge occurs between the second lower electrode 12b and the second upper electrode 22b since the same potential is applied to the second lower electrode 12b and the second upper electrode 22b. On the other hand, a surface discharge in a parallel direction to the lower substrate 10 and the upper substrate 20 since a predetermined potential difference is existed between the first lower electrode 12a and the first upper electrode 22a and between the second lower electrode 12b and the second upper electrode 22b, respectively.

However, in a flat lamp having above configuration, there is a problem of increasing the discharge voltage when a gap between the electrodes is increased, a partial pressure of the Xe gas is increased, or the pressure of the discharge gas is increased to increase the luminous efficiency.

SUMMARY OF THE INVENTION

The present invention provides an improved flat lamp structure that can reduce discharge voltage and improve luminous efficiency.

According to an aspect of the present invention, there is provided a flat lamp comprising a lower substrate and an upper substrate that form discharge space therebetween disposed facing each other, a plurality of discharge electrodes formed at least on one of the lower substrate and the upper substrate, a plurality of spacers that form a plurality of discharge cells by defining the discharge space, and disposed parallel to the discharge electrodes between the lower substrate and the upper substrate, a plurality of auxiliary electrodes, to which a voltage is induced by applying a voltage to the discharge electrodes, formed on a surface of the spacers, and a fluorescent layer formed on an inner wall of the discharge cells.

Here, the discharge electrodes may include a plurality of first and second electrodes, the first and second electrodes may be disposed in each of the discharge cells by forming pairs, and the spacers may be disposed on a location between the adjacent first electrodes and between the adjacent second electrodes.

The auxiliary electrodes may be formed on both sides of the spacers along the length direction of the spacers. Here, the auxiliary electrodes can be formed of at least a metal selected from the group consisting of Ag, Al, Cr, and Cu. Also, the auxiliary electrodes can be formed of a transparent conductive material, such as ITO.

An electron emission material that includes one of CNT and BN can be coated on a surface of the auxiliary electrodes.

The spacers can be formed of a dielectric material, such as transparent glass.

The fluorescent layer can be formed on an inner surface of the lower substrate and the upper substrate and surfaces of the auxiliary electrodes, and frames that seal the discharge space may be formed between the lower substrate and the upper substrate.

The discharge space can be filled with a gas mixture of a Ne gas and a Xe gas.

According to another aspect of the present invention, there is provided a flat lamp comprising a lower substrate and an upper substrate that form a discharge space therebetween and disposed facing each other, a frame that seals the discharge space and disposed between the lower substrate and the upper substrate, a plurality of discharge electrodes formed at least on one of the lower substrate and the upper substrate, a plurality of spacers that form a plurality of discharge cells by defining the discharge space, and disposed parallel to the discharge electrodes between the lower substrate and the upper substrate, at least an end of which is disposed with a distance from an inner wall of the frame, a plurality of auxiliary electrodes, to which a voltage is induced by applying a voltage to the discharge electrodes, formed on a surface including an end surface of the spacers, and a fluorescent layer formed on an inner wall of the discharge cells.

Here, the auxiliary electrodes can be formed to surround a side surface of the spacers or can be formed on both side surfaces of the spacers along the length direction of the spacers. Also, the auxiliary electrodes can be formed on a side surface of the spacers along the length direction of the spacers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 3:
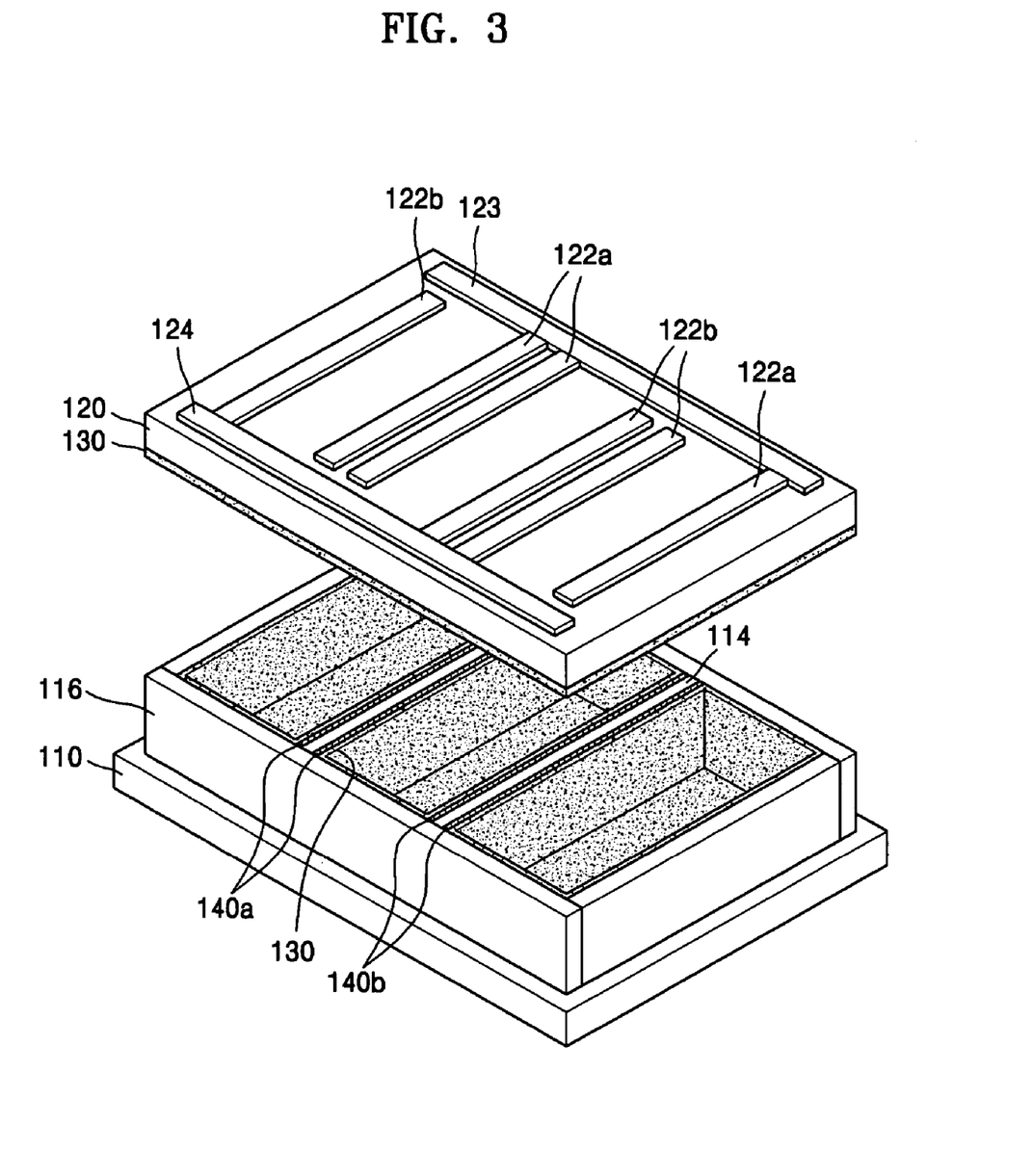
FIG. 3 is an exploded perspective view of a flat lamp according to an embodiment of the present invention.
Figure 4:
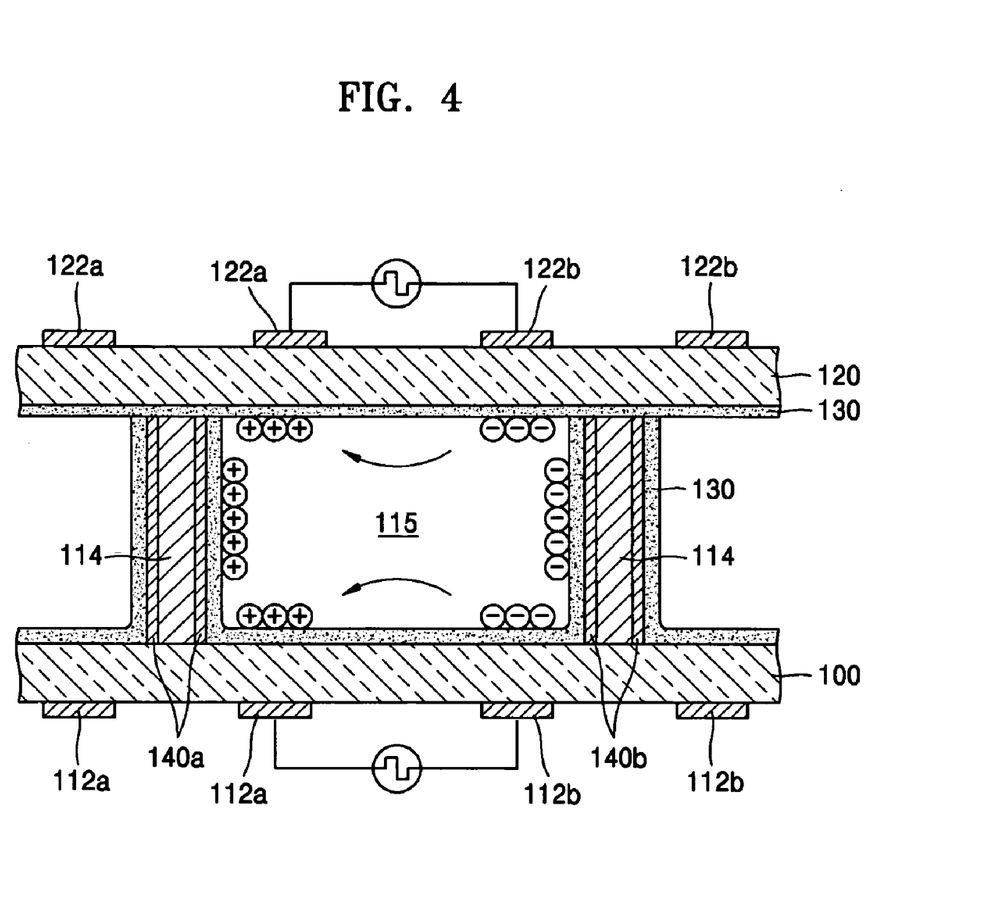
FIG. 4 is a partial cross-sectional view of the flat lamp of FIG. 3.

FIG. 3 is an exploded perspective view of a flat lamp according to an embodiment of the present invention, and FIG. 4 is a partial cross-sectional view of the flat lamp of FIG. 3.

Referring to FIGS. 3 and 4, a discharge space is formed by disposing a lower substrate 110 and an upper substrate 120 facing each other. Here, the lower substrate 110 and the upper substrate 120 are generally formed of a transparent glass substrate. Frames 116 that seal the discharge space and maintains a predetermined gap between the lower substrate 110 and the upper substrate 120 is formed therebetween. A discharge gas which is a mixture of a Ne gas and a Xe gas is filled in the discharge space.

A plurality of spacers 114 is disposed parallel to each other between the lower substrate 110 and the upper substrate 120. The spacers 114 support the lower substrate 110 and the upper substrate 120, and form a plurality of discharge cells 115 by defining the discharge space. Also, the spacers 114 prevent crosstalk between the adjacent discharge cells 115, and can be formed of a dielectric material, preferably, transparent glass.

A plurality of discharge electrodes for generating plasma discharge in the discharge cells 115 by a voltage applied from a power source are formed on an outside surface of the upper substrate 120 and the lower substrate 110. More specifically, a plurality of first upper electrodes 122a and second upper electrodes 122b are formed on an upper surface of the upper substrate 120, and at this time, the first and second upper electrodes 122a and 122b are formed in pairs in each of the discharge cells 115. Accordingly, the spacers 114 are disposed on locations corresponding to the locations between the adjacent first upper electrodes 122a and the locations between the adjacent second upper electrodes 122b. The first and second electrodes 122a and 122b are preferably formed of a transparent material, such as indium tin oxide (ITO), so as to be able to transmit visible light generated from the discharge cells 115, or can be formed of a metal. Here, the first upper electrodes 122a are connected to a first upper common line 123 and the second upper electrodes 122b are connected to a second upper common line 124.

On the other hand, a plurality of first lower electrodes 112a and second lower electrodes 112b are formed on a lower surface of the lower substrate 110, and at this time, the first and second lower electrodes 112a and 112b are formed in pairs in each of the discharge cells 115. Accordingly, the spacers 114 are disposed on locations corresponding to the locations between the adjacent first lower electrodes 112a and the locations between the adjacent second lower electrodes 112b. The first and second lower electrodes 112a and 112b can be formed of ITO or a metal. Here, the first lower electrodes 112a are connected to a first lower common line (not shown) and the second lower electrodes 112b are connected to a second lower common line (not shown).

In the above structure, no discharge is generated between the first lower electrodes 112a and the first upper electrodes 122a since the same potential is applied to the first lower electrodes 112a and the first upper electrodes 122a. Also, no discharge is generated between the second lower electrodes 112b and the second upper electrodes 122b since the same potential is applied to the second lower electrodes 112b and the second upper electrode 122b. On the other hand, surface discharges are generated in a parallel direction to the lower substrate 110 and the upper substrate 120 since a predetermined potential difference is existed respectively between the first lower electrodes 112a and the second lower electrodes 112b and between the first upper electrodes 122a and the second upper electrodes 122b.

Heretofore, the forming of the first and second upper electrodes 122a and 122b on an upper surface of the upper substrate 120 and the forming of the first and second lower electrodes 112a and 112b on a lower surface of the lower substrate 110 have described. However, in the present invention, not only can the first and second lower electrodes 112a and 112b be formed on a lower surface of the lower substrate 110 or the first and second upper electrodes 122a and 122b be formed on an upper surface of the upper substrate 120, but also.

the first and second upper electrodes 122a and 122b can additionally be formed on a lower surface of the upper substrate 120 and the first and second lower electrodes 112a and 112b can be formed on an upper surface of the lower substrate 110.

First and second auxiliary electrodes 140a and 140b, to which a voltage is induced by applying a predetermined voltage to the discharge electrodes 112a, 112b, 122a, and 122b, are formed on a surface of the spacers 114. The first and second auxiliary electrodes 140a and 140b are formed in a length direction of the spacers 114 on both sides of the spacers 114. Here, the first auxiliary electrode 140a is an electrode to which a voltage is induced by applying a voltage to the first upper electrodes 122a and the first lower electrodes 112a, and the second auxiliary electrode 140b is an electrode to which a voltage is induced by applying a voltage to the second upper electrodes 122b and the second lower electrodes 112b. The first and second auxiliary electrodes 140a and 140b can be formed of at least a metal selected form the group consisting of Ag, Al, Cr, and Cu, or can be formed of a transparent conductive material, such as ITO. An electron emission material that includes carbon nanotube (CNT) or boron nitride (BN) can be coated on a surface of the first and second auxiliary electrodes 140a and 140b to increase the field emission.

A fluorescent layer 130 that generates visible light by being excited by ultraviolet rays generated by discharge is formed on an inner wall of the discharge cells 115. More specifically, the fluorescent layer 130 can be formed on an upper surface of the lower substrate 110, on a lower surface of the upper substrate 120, and on surfaces of the first and second auxiliary electrodes 140a and 140b.

In a flat lamp having an above structure, a voltage corresponding to a voltage applied to the first upper electrodes 122a and the first lower electrodes 112a is induced to the first auxiliary electrodes 140a and a voltage corresponding to a voltage applied to the second upper electrodes 122b and the second lower electrodes 112b is induced to the second auxiliary electrodes 140b when a predetermined alternate voltage is applied between the first and second upper electrodes 122a and 122b and between the first and second lower electrodes 112a and 112b. Accordingly, luminous efficiency can be improved by forming an electric field in three dimensions and uniform in the discharge cells 115 during discharging. Also, another discharge can occur at a further lower discharge voltage since charges are accumulated on both sides of the spacers 114 after discharging.

Figure 5:
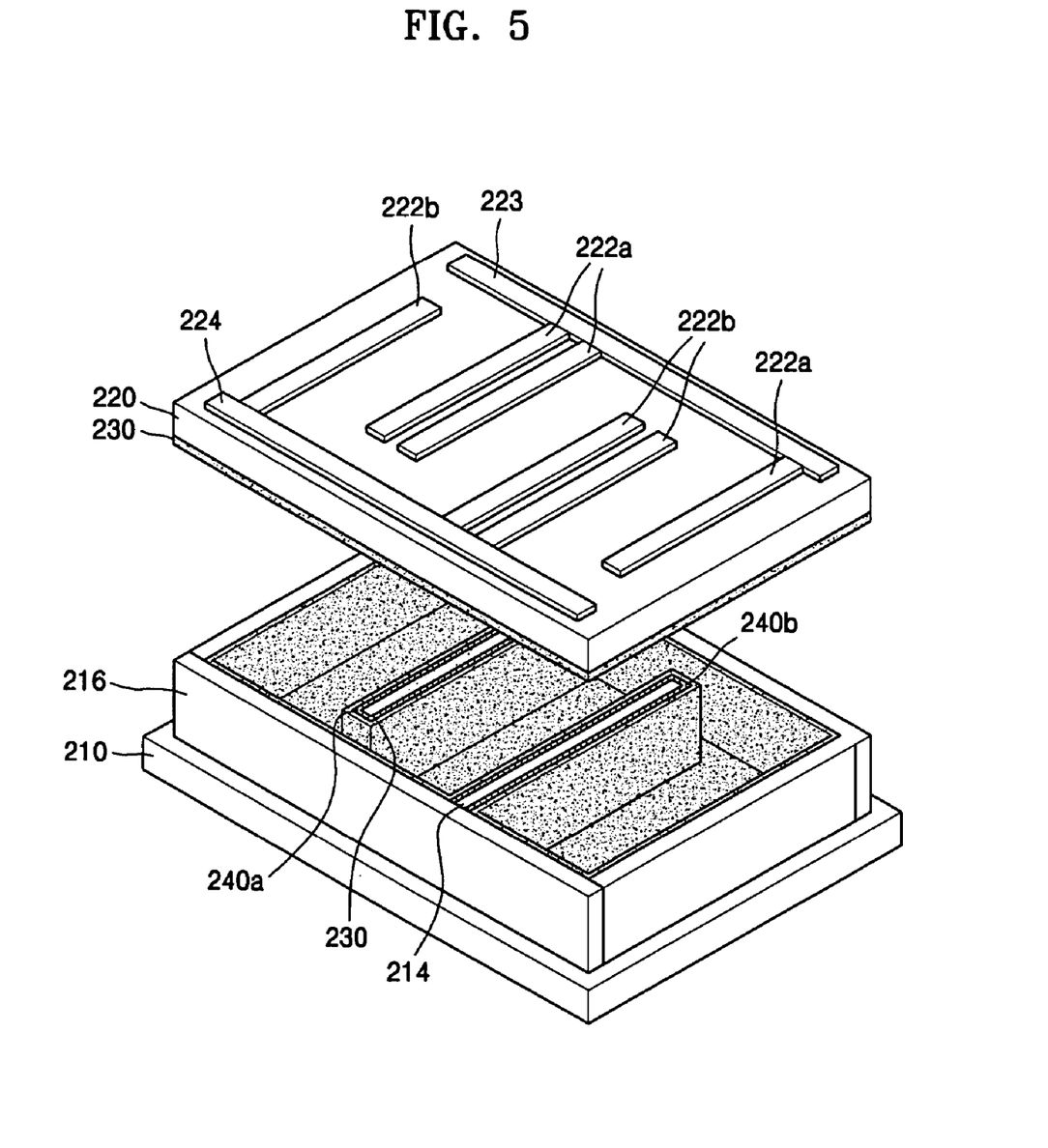
FIG. 5 is an exploded perspective view of flat lamp according to another embodiment of the present invention.
Figure 6:
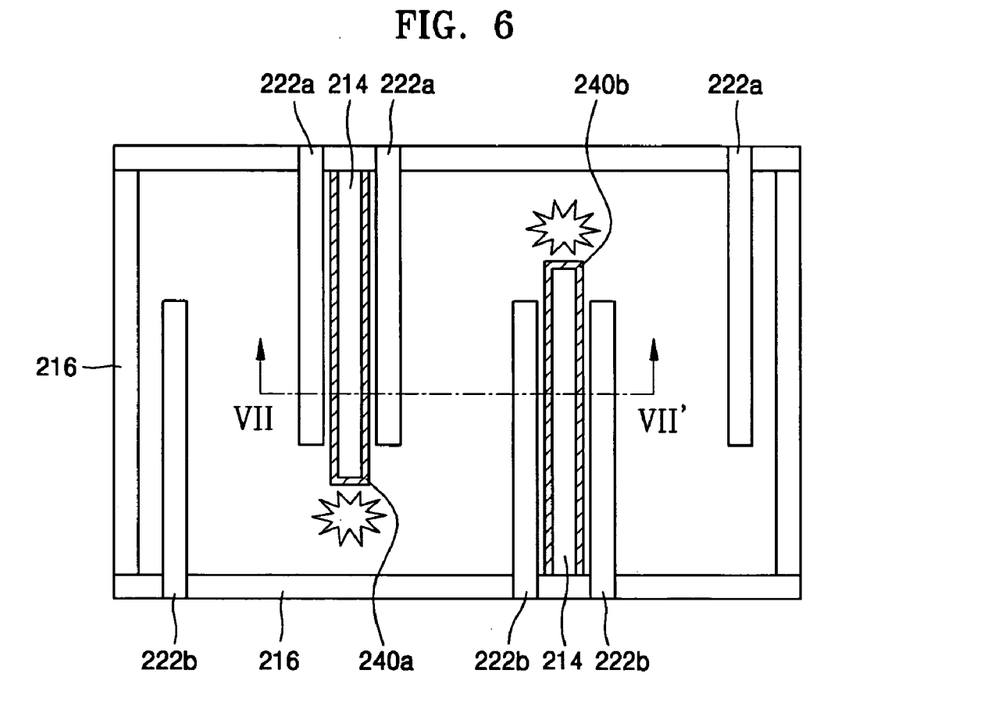
FIG. 6 is a plan view of the flat lamp of FIG. 5.
Figure 7:
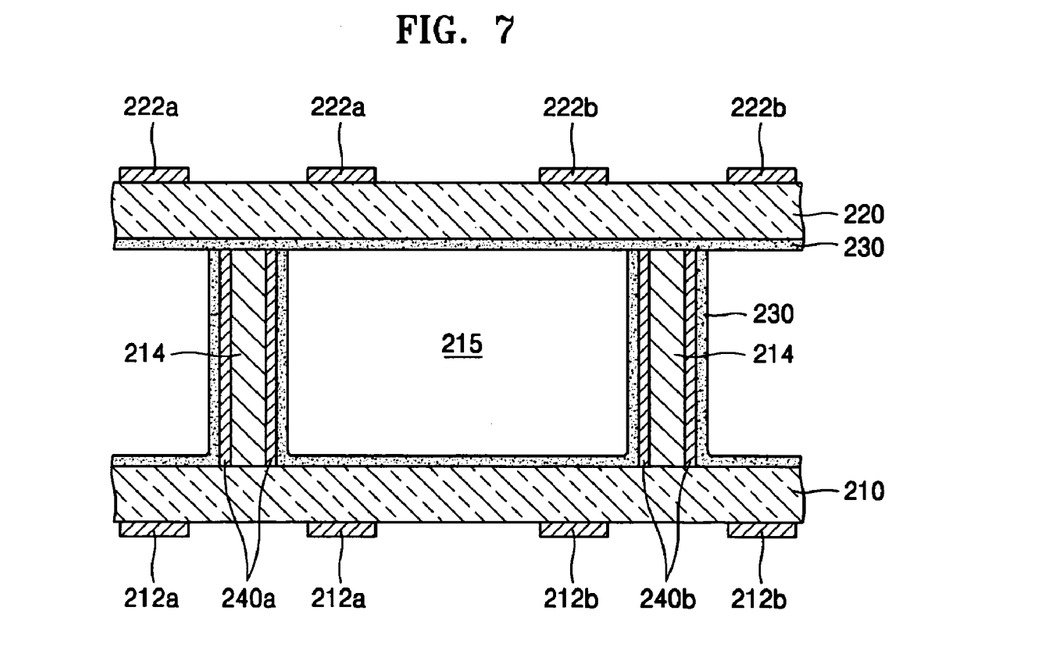
FIG. 7 is a cross-sectional view taken line Vii-Vii' in FIG. 6.

FIG. 5 is an exploded perspective view of a flat lamp according to another embodiment of the present invention. FIG. 6 is a plan view of the flat lamp of FIG. 5 and FIG. 7 is a cross-sectional view taken line Vii-Vii' in FIG. 6. The present embodiment will now be described mainly with different points from the aforementioned embodiment.

Referring to FIGS. 5 through 7, a discharge space is formed between a lower substrate 210 and an upper substrate 220 disposed facing each other. Frames 216 that seal the discharge space and maintaining a uniform gap between the lower substrate 210 and the upper substrate 220 is formed therebetween. The discharge space is filled with a gas mixture of Ne gas and Xe gas.

A plurality of spacers 214 are disposed in parallel between the lower substrate 210 and the upper substrate 220 to form a plurality of discharge cells 215. Here, the spacer 214, an end of which is disposed at a distance from an inner wall of the frames 216 so that the discharge gas can flow into the discharge cells 215. Both ends of the spacers 214 can also be disposed with a distance from the frames 216.

A plurality of first upper electrodes 222a and second upper electrodes 222b are formed on an upper surface of the upper substrate 220, and the first and second upper electrodes 222a and 222b are disposed in each discharge cell 215 by forming pairs. Here, the first upper electrodes 222a are connected to a first upper common line 223, and the second upper electrodes 222b are connected to a second common line 224. The spacers 214 are disposed on locations corresponding to locations between the first upper electrodes 222a and between the second upper electrodes 222b. On the other hand, a plurality of first lower electrodes 212a and second lower electrodes 212b are formed on a lower surface of the lower substrate 210. At this time, the first and second lower electrodes 212a and 212b are disposed in each of the discharge cells 215 by forming pairs. Here, the first lower electrodes 212a are connected to a first lower common line (not shown) and the second lower electrodes 212b are connected to a second lower common line (not shown).

First and second auxiliary electrodes 240a and 240b are formed on a surface of the spacers 214. More specifically, the first and second auxiliary electrodes 240a and 240b are formed to surround the side surface of the spacers 214 including the end surface of the spacers 214. Here, the first auxiliary electrode 240a is an electrode to which a voltage is induced by applying a voltage to the first upper electrodes 222a and the first lower electrodes 212a, and the second auxiliary electrode 240b is an electrode to which a voltage is induced by applying a voltage to the second upper electrodes 222b and the second lower electrodes 212b. The first and second auxiliary electrodes 240a and 240b can be formed of at least a metal selected form the group consisting of Ag, Al, Cr, and Cu or a transparent conductive material, such as ITO. An electron emission material that includes carbon nanotube (CNT) or boron nitride (BN) can be coated on a surface of the first and second auxiliary electrodes 240a and 240b to increase the field emission.

A fluorescent layer 230 that generates visible light by being excited by ultraviolet rays generated by discharge is formed on an inner wall of the discharge cells 215. More specifically, the fluorescent layer 230 can be formed on an upper surface of the lower substrate 210, on a lower surface of the upper substrate 220, and on surfaces of the first and second auxiliary electrodes 240a and 240b.

When the first and second auxiliary electrodes 240a and 240b are formed to surround the side surfaces of the spacers 214, an end of which is disposed with a distance from the frames 216, a discharge can start at a lower voltage since electric fields are concentrated on edges of the spacers 214. Also, luminous efficiency can be improved by forming the electric field in three dimensions and uniform in the discharge cells 215 during discharging. Also, a next discharge can occur at a further lower discharge voltage since charges are accumulated on both sides of the spacers 214 after discharging.

Figure 8:
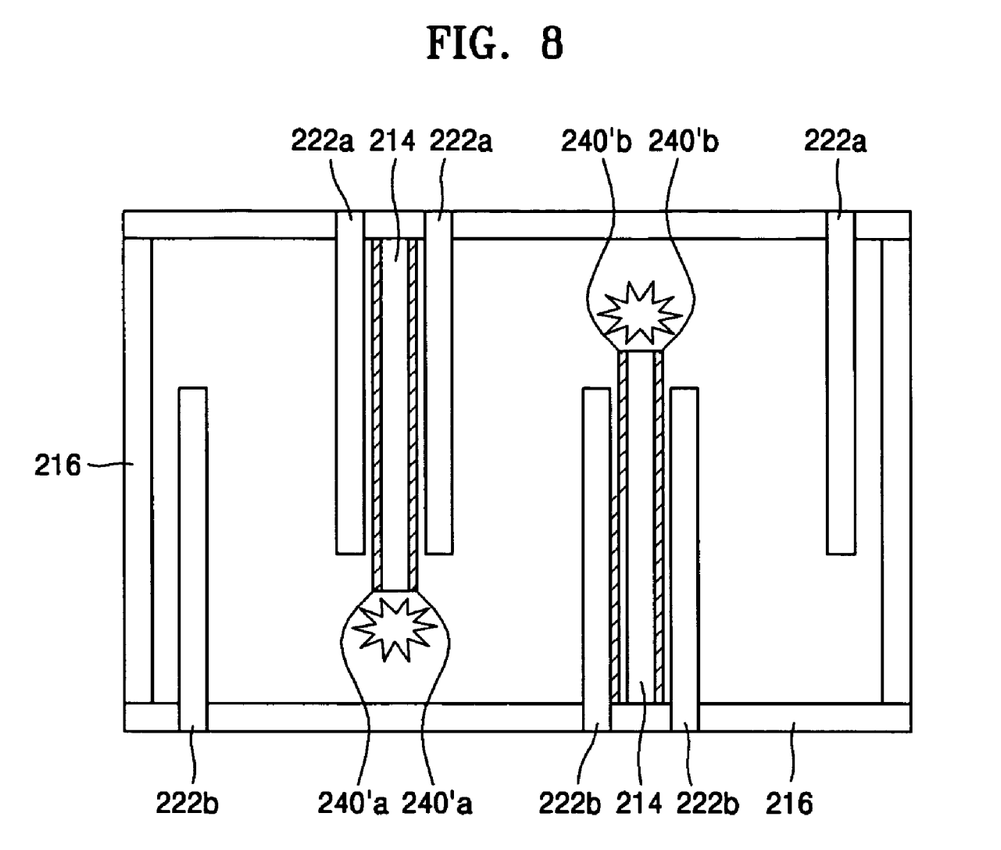
FIG. 8 is a plan view of a modified version of a flat lamp according to another embodiment of the present invention.

FIG. 8 is a plan view of a modified version of a flat lamp according to another embodiment of the present invention. Referring to FIG. 8, first and second auxiliary electrodes 240'a and 240'b can be formed on both sides of the spacers 214 along the length direction of the spacers 214.

Figure 9:
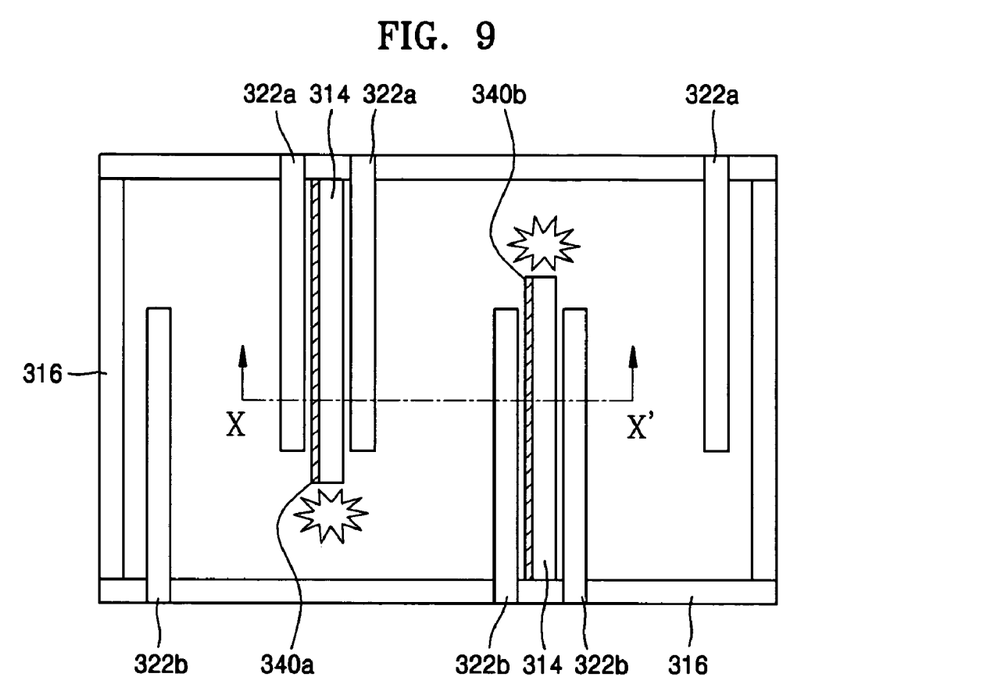
FIG. 9 is a plan view of a flat lamp according to still another embodiment of the present invention.
Figure 10:
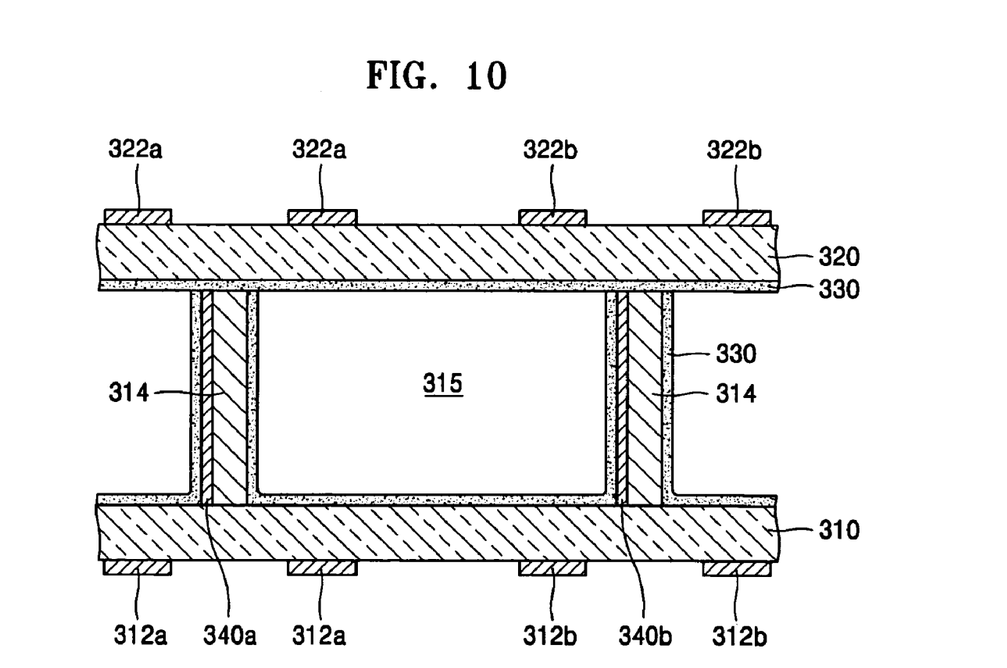
FIG. 10 is a partial cross-sectional view taken line X-X' in FIG. 9.

FIG. 9 is a plan view of a flat lamp according to still another embodiment of the present invention, and FIG. 10 is a partial cross-sectional view taken line X-X' in FIG. 9. Another embodiment of the present invention will now be described mainly with the different points from the aforementioned embodiments.

Referring to FIGS. 9 and 10, a plurality of spacers 314 that form discharge cells 315 between a lower substrate 310 and an upper substrate 320 is disposed parallel to each other. At this time, an end of the spacers 314 is disposed with a distance from an inner wall of frames 316. Both ends of the spacers 314 can also be disposed with a distance from the inner wall of the frames 316.

First and second upper electrodes 322a and 322b are formed on each of the discharge cells 315 on an upper surface of the upper substrate 320 by forming pairs, and first and second lower electrodes 312a and 312b are formed in each of the discharge cells 315 on a lower surface of the lower substrate 310 by forming pairs.

First and second auxiliary electrodes 340a and 340b are formed alternately on a side surface of the spacers 314. Here, the first auxiliary electrode 340a is an electrode to which a voltage is induced by applying a voltage to the first upper electrodes 322a and the first lower electrodes 312a, and the second auxiliary electrode 340b is an electrode to which a voltage is induced by applying a voltage to the second upper electrodes 322b and the second lower electrodes 312b.

Fluorescent layers are formed on an upper surface of the lower substrate 310, on a lower surface of the upper substrate 320, on surfaces of the first and second auxiliary electrodes 340a and 340b, and the other side surface of the spacers 314.

When the first and second auxiliary electrodes 340a and 340b are formed on a side surface of the spacers 314 on which an end is disposed with a distance from the frames 316, a discharge can start at a lower voltage since electric fields are concentrated on edges of the spacers 214.

Figure 11:
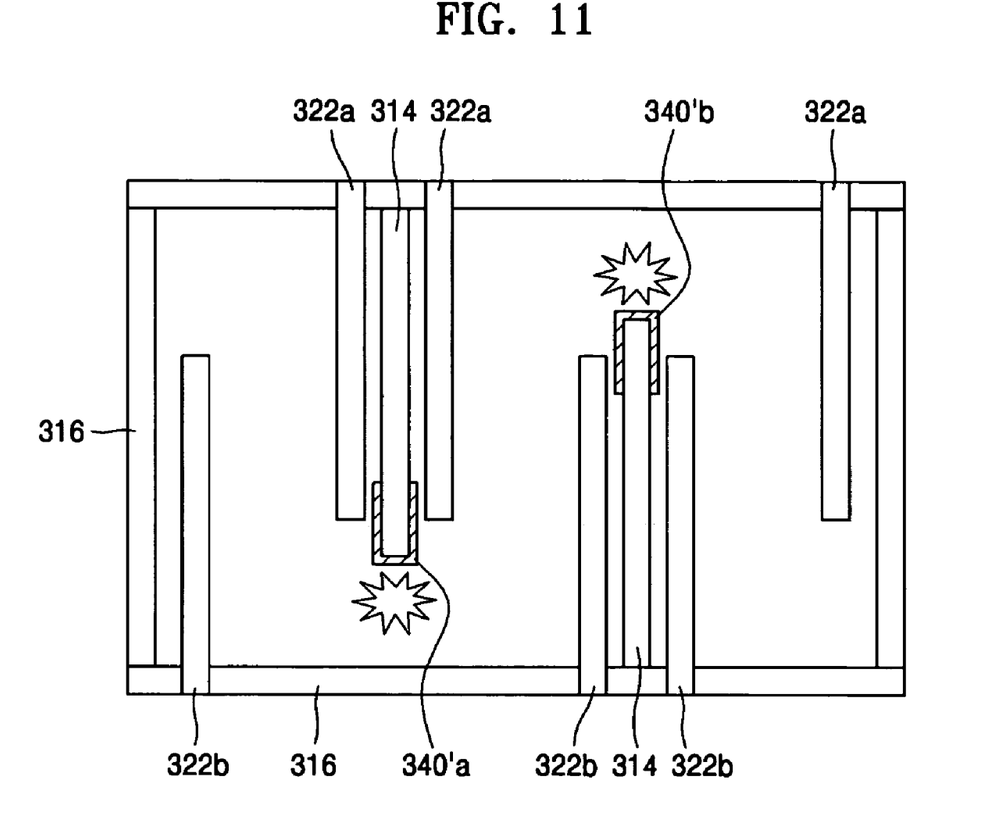
FIG. 11 is a plan view of a modified version of a flat lamp according to still another embodiment of the present invention.

FIG. 11 is a plan view of a modified version of a flat lamp according to still another embodiment of the present invention. Referring to FIG. 11, the first and second auxiliary electrodes 340'a and 340'b are formed only on an ends of the spacers 314.

As in the aforementioned description, a flat lamp according to the present invention can increase luminous efficiency and reduce discharge voltage by forming auxiliary electrodes on a surface of the spacers, to which a voltage is induced by applying a voltage to the discharge electrodes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flat lamp comprising:
   a lower substrate and an upper substrate that form a discharge space therebetween and disposed facing each other;
   a plurality of discharge electrodes formed on at least one of the lower substrate and the upper substrate;
   a plurality of spacers that form a plurality of discharge cells, the spacers being disposed parallel to the discharge electrodes between the lower substrate and the upper substrate;
   a plurality of auxiliary electrodes to which a voltage is induced by applying a voltage to the discharge electrodes, each of the auxiliary electrodes being formed on a respective surface of the spacers; and
   a fluorescent layer formed on an inner wall of the discharge cells.

2. The flat lamp of claim 1, wherein the discharge electrodes includes a plurality of first and second electrodes, the first and second electrodes are disposed in each of the discharge cells by forming pairs, and the spacers are disposed on a location between the adjacent first electrodes and between the adjacent second electrodes.

3. The flat lamp of claim 1, wherein the auxiliary electrodes are formed on both sides of the spacers along the length direction of the spacers.

4. The flat lamp of claim 1, wherein the auxiliary electrodes are formed of a metal.

5. The flat lamp of claim 4, wherein the auxiliary electrodes are formed of at least a metal selected from the group consisting of Ag, Al, Cr, and Cu.

6. The flat lamp of claim 1, wherein the auxiliary electrodes are formed of a transparent conductive material, such as ITO.

7. The flat lamp of claim 1, wherein an electron emission material is coated on a surface of the auxiliary electrodes.

8. The flat lamp of claim 7, wherein the electron emission material includes one of CNT and BN.

9. The flat lamp of claim 1, wherein the spacers are formed of a dielectric material.

10. The flat lamp of claim 9, wherein the spacers are formed of transparent glass.

11. The flat lamp of claim 1, wherein the fluorescent layer is formed on an inner surface of the lower substrate and the upper substrate and surfaces of the auxiliary electrodes.

12. The flat lamp of claim 1 further comprising frames that seal the discharge space between the lower substrate and the upper substrate.

13. The flat lamp of claim 1, wherein the discharge space is filled with a gas mixture of Ne gas and Xe gas.

14. A flat lamp comprising:
    a lower substrate and an upper substrate that form a discharge space therebetween, wherein the lower and upper substrates are disposed facing each other;
    a frame that seals the discharge space, the frame being disposed between the lower substrate and the upper substrate;
    a plurality of discharge electrodes formed on at least one of the lower substrate and the upper substrate;
    a plurality of spacers that form a plurality of discharge cells, the plurality of spacers being disposed parallel to the discharge electrodes between the lower substrate and the upper substrate, wherein one end of each spacer is in the discharge space disposed at a distance from an inner wall of the frame and another end contacts an opposite inner wall of the frame;
    a plurality of auxiliary electrodes, to which a voltage is induced by applying a voltage to the discharge electrodes, formed on a surface the spacers that includes the one end disposed from the inner wall of the frame; and
    a fluorescent layer formed on an inner wall of the discharge cells.

15. The flat lamp of claim 14, wherein the discharge electrodes includes a plurality of first and second electrodes, the first and second electrodes are disposed in each of the discharge cells by forming pairs, and the spacers are disposed on a location between the adjacent first electrodes and between the adjacent second electrodes.

16. The flat lamp of claim 14, wherein the auxiliary electrodes are formed to surround side surfaces of the spacers.

17. The flat lamp of claim 14, wherein the auxiliary electrodes are formed on both sides of the spacers along the length direction of the spacers.

18. The flat lamp of claim 14, wherein the auxiliary electrodes are formed on a side of the spacers along the length direction of the spacers.

19. The flat lamp of claim 14, wherein the auxiliary electrodes are formed of a metal.

20. The flat lamp of claim 19, wherein the auxiliary electrodes are formed of at least a metal selected from the group consisting of Ag, Al, Cr, and Cu.

21. The flat lamp of claim 14, wherein the auxiliary electrodes are formed of a transparent conductive material, such as ITO.

22. The flat lamp of claim 14, wherein an electron emission material is coated on a surface of the auxiliary electrodes.

23. The flat lamp of claim 22, wherein the electron emission material includes one of CNT and BN.

24. The flat lamp of claim 14, wherein the spacers are formed of a dielectric material.

25. The flat lamp of claim 24, wherein the spacers are formed of transparent glass.

26. The flat lamp of claim 14, wherein the fluorescent layer is formed on an inner surface of the lower substrate and the upper substrate and surfaces of the auxiliary electrodes.

27. The flat lamp of claim 14, wherein the discharge space is filled with a gas mixture of Ne gas and Xe gas.

* * * * *